United States Patent
Zhang

(10) Patent No.: US 10,389,425 B2
(45) Date of Patent: *Aug. 20, 2019

(54) SUB-BAND FEEDBACK FOR BEAMFORMING ON DOWNLINK MULTIPLE USER MIMO CONFIGURATIONS

(71) Applicant: Marvell World Trade Ltd., St. Michael (BB)

(72) Inventor: Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,542

(22) Filed: Oct. 20, 2017

(65) Prior Publication Data

US 2018/0041263 A1 Feb. 8, 2018

Related U.S. Application Data

(63) Continuation of application No. 15/008,618, filed on Jan. 28, 2016, now Pat. No. 9,806,784, which is a
(Continued)

(51) Int. Cl.
*H04B 7/06* (2006.01)
*H04L 25/03* (2006.01)
(Continued)

(52) U.S. Cl.
CPC ......... *H04B 7/0619* (2013.01); *H04B 7/0452* (2013.01); *H04B 7/0617* (2013.01);
(Continued)

(58) Field of Classification Search
CPC ............. H04W 72/04; H04W 72/0446; H04W 72/0453; H04W 72/046; H04W 24/10;
(Continued)

(56) References Cited

U.S. PATENT DOCUMENTS 6,862,440 B2  3/2005  Sampath
7,039,442 B1  5/2006  Joham et al.
(Continued)

FOREIGN PATENT DOCUMENTS

CN  101568129 A  10/2009
CN  202568129 U  12/2012
(Continued)

OTHER PUBLICATIONS

Zhang et al., "11 ac Explicit Sounding and Feedback", *The Institute of Electrical and Electronics Engineers*, doc. No. IEEE 802.11-10/11 05r0, 44 pages (Sep. 2010).
(Continued)

*Primary Examiner* — Hardikkumar D Patel

(57) ABSTRACT

A first communication device receives a sounding packet that was transmitted by a second communication device over a communication channel, and performs a channel estimation on a subchannel block of the communication channel to determine steering matrix feedback information for the subchannel block. The subchannel block spans a contiguous partial bandwidth of the communication channel and does not span an entire bandwidth of the communication channel. The first communication device transmits a communication frame to the second communication device, the communication frame i) including the steering matrix feedback information for the subchannel block, and ii) not including steering matrix feedback information for the one or more other subchannel blocks of the communication channel.

20 Claims, 8 Drawing Sheets

Related U.S. Application Data continuation of application No. 13/205,257, filed on Aug. 8, 2011, now Pat. No. 9,252,991.

(60) Provisional application No. 61/372,378, filed on Aug. 10, 2010.

(51) Int. Cl.
*H04B 7/0452* (2017.01)
*H04W 24/10* (2009.01)

(52) U.S. Cl.
CPC .... *H04L 25/0398* (2013.01); *H04L 25/03343* (2013.01); *H04L 2025/03808* (2013.01); *H04L 2025/03815* (2013.01); *H04W 24/10* (2013.01)

(58) Field of Classification Search
CPC ... H04W 48/10; H04W 4/06; H04W 74/0808; H04W 72/042; H04W 48/20; H04L 25/03343; H04L 25/0398; H04L 2025/03808; H04L 2025/03815; H04L 27/28; H04L 5/0023; H04L 5/0048; H04L 27/2613; H04L 1/0041; H04L 1/0065; H04L 1/0071; H04L 1/0625; H04L 5/0037; H04L 5/006; H04L 5/0064; H04L 25/0224; H04B 7/0619; H04B 7/0452; H04B 7/0617; H04B 7/208; H04B 7/0417; H04B 7/061; H04B 7/0805; H04B 7/024; H04B 7/0691; H04B 7/0874; H04B 1/18; H04B 7/0634; H04B 7/0636; H04B 7/0643; H04H 20/71; H04Q 7/24; H04Q 7/32
See application file for complete search history.

(56) References Cited

U.S. PATENT DOCUMENTS

| | | |
|---|---|---|
| 7,206,354 B2 | 4/2007 | Wallace et al. |
| 7,486,740 B2 | 2/2009 | Inanoglu |
| 7,599,332 B2 | 10/2009 | Zelst et al. |
| 7,720,030 B2 | 5/2010 | Solomon et al. |
| 7,729,439 B2 | 6/2010 | Zhang et al. |
| 7,742,390 B2 | 6/2010 | Mujtaba |
| 7,907,912 B2 | 3/2011 | Nam et al. |
| 7,917,107 B2 | 3/2011 | Gu et al. |
| 8,073,486 B2 | 12/2011 | Mundarath et al. |
| 8,144,647 B2 | 3/2012 | Nabar et al. |
| 8,149,811 B2 | 4/2012 | Nabar et al. |
| 8,155,138 B2 | 4/2012 | van Nee |
| 8,270,909 B2 | 9/2012 | Zhang et al. |
| 8,289,869 B2 | 10/2012 | Sawai |
| 8,339,978 B2 | 12/2012 | Sawai et al. |
| 8,472,383 B1 | 6/2013 | Banerjea et al. |
| 8,526,351 B2 | 9/2013 | Fischer et al. |
| 8,599,804 B2 | 12/2013 | Erceg et al. |
| 8,619,907 B2 | 12/2013 | Mujtaba et al. |
| 8,660,497 B1 | 2/2014 | Zhang et al. |
| 8,724,546 B2 | 5/2014 | Zhang et al. |
| 8,724,720 B2 | 5/2014 | Srinivasa et al. |
| 8,873,525 B2 | 10/2014 | Liu et al. |
| 8,885,620 B2 | 11/2014 | Liu et al. |
| 8,886,755 B1 | 11/2014 | Liu et al. |
| 8,923,217 B2 | 12/2014 | Liu et al. |
| 9,209,881 B2 | 12/2015 | Srinivasa et al. |
| 9,252,991 B2 | 2/2016 | Zhang |
| 9,806,784 B2 | 10/2017 | Zhang |
| 2003/0153316 A1 | 8/2003 | Noll et al. |
| 2004/0066754 A1 | 4/2004 | Hottinen |
| 2005/0152299 A1* | 7/2005 | Stephens .............. H04W 28/20 370/315 |
| 2005/0157805 A1 | 7/2005 | Walton et al. |
| 2005/0195733 A1* | 9/2005 | Walton .................. H04B 7/0413 370/208 |
| 2006/0063492 A1 | 3/2006 | Iacono et al. |
| 2007/0086400 A1 | 4/2007 | Shida et al. |
| 2007/0142089 A1 | 6/2007 | Roy |
| 2007/0155336 A1 | 7/2007 | Nam et al. |
| 2007/0195811 A1 | 8/2007 | Basson et al. |
| 2007/0201566 A1 | 8/2007 | Solomon et al. |
| 2007/0253501 A1* | 11/2007 | Yamaura .............. H04B 7/0417 375/262 |
| 2007/0268181 A1* | 11/2007 | Howard ................. H01Q 21/00 342/368 |
| 2007/0293214 A1* | 12/2007 | Ansari .............. H04B 7/18513 455/427 |
| 2007/0298742 A1* | 12/2007 | Ketchum ............. H04B 7/0617 455/186.1 |
| 2008/0075058 A1 | 3/2008 | Mundarath et al. |
| 2008/0076370 A1 | 3/2008 | Kotecha et al. |
| 2008/0187032 A1* | 8/2008 | Pande ................. H04L 25/0204 375/227 |
| 2008/0247370 A1* | 10/2008 | Gu ........................ H04B 7/024 370/338 |
| 2009/0196163 A1 | 8/2009 | Du |
| 2009/0245153 A1 | 10/2009 | Li et al. |
| 2009/0274226 A1 | 11/2009 | Mondal et al. |
| 2009/0296563 A1* | 12/2009 | Kishiyama .............. H04J 13/00 370/210 |
| 2009/0296650 A1 | 12/2009 | Venturino et al. |
| 2010/0041406 A1 | 2/2010 | Kim et al. |
| 2010/0046656 A1 | 2/2010 | van Nee et al. |
| 2010/0246524 A1 | 9/2010 | Hou et al. |
| 2010/0246702 A1 | 9/2010 | Miyoshi |
| 2010/0260159 A1 | 10/2010 | Zhang et al. |
| 2011/0002219 A1 | 1/2011 | Kim et al. |
| 2011/0096796 A1 | 4/2011 | Zhang et al. |
| 2011/0164695 A1* | 7/2011 | Zheng .................... H04B 7/086 375/260 |
| 2011/0199946 A1* | 8/2011 | Breit .................... H04B 7/0626 370/310 |
| 2011/0305205 A1* | 12/2011 | Gong .................... H04L 1/1861 370/329 |
| 2012/0039196 A1 | 2/2012 | Zhang |

FOREIGN PATENT DOCUMENTS

| | | |
|---|---|---|
| EP | 2106038 | 9/2009 |
| JP | 2009-049604 A | 3/2009 |
| JP | 2010-021941 A | 1/2010 |
| KR | 10-2006-0111702 | 10/2006 |
| KR | 10-2009-0031434 | 3/2009 |
| WO | WO-2005/071864 A2 | 8/2005 |
| WO | WO-2005/081483 | 9/2005 |
| WO | WO-2007/117949 | 10/2007 |
| WO | WO-2008/002972 A2 | 1/2008 |
| WO | WO-2009/002269 | 12/2008 |
| WO | WO-2009/048418 A2 | 4/2009 |
| WO | WO-2012-021449 | 2/2012 |

OTHER PUBLICATIONS

"Discussion on multiple PMI feedback," Samsung, *3GPP TSG RAN WG1 Meeting* #60, San Francisco, USA, 2 pages, (Feb. 2010).

Ansariet al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Chen, "Home Network Basis: Transmission Environments and Wired/Wireless Protocols," Prentice Hall, pp. 1-26 (Jul. 2003).

Communication in European Application No. 11752371.2, dated Mar. 19, 2013.

Communication pursuant to Article 94(3) EPC in European Application No. 11 752 371.2-1851, dated Jul. 18, 2016 (4 pages).

Communication pursuant to Article 94(3) EPC in European Application No. 11752371.2, dated Apr. 20, 2015 (4 pages).

Erceg et al., "Sounding and P Matrix Proposal," *Broadcomm*, https://mentor.ieee.org/802.11/dcn/10/11-10-0566-02-00ac-sounding-p-matrix.ppt, slides 1-14 (May 2010).

Final Notice of Reasons for Rejection for Japanese Application No. 2013-524148, dated Mar. 22, 2016, with English translation (6 pages).

(56) References Cited

OTHER PUBLICATIONS

First Office Action in Chinese Application No. 201180023094.9, dated Nov. 27, 2014, with English translation (27 pages).
Gunnam et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Hiertz et al., "The IEEE 802.11 Universe," *IEEE Communications Magazine*, pp. 62-70, (Jan. 2010).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).
IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
International Preliminary Report on Patentability in International Application No. PCT/US2011/040527, dated Jan. 3, 2013.
International Preliminary Report on Patentability in International Application No. PCT/US2011/046934, dated Feb. 21, 2013.
International Search Report and Written Opinion in International Application No. PCT/US2011/046934, dated Jan. 12, 2012.
International Search Report and Written Opinion in PCT/US2011/040527, dated Sep. 22, 2011.
Love et al., "An Overview of Limited Feedback in Wireless Communication Systems," IEEE J. on Selected Areas in Communications, vo. 26, No. 8, pp. 1341-1365 (Oct. 2008).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Notice of Reasons for Rejection in Japanese Application No. 2013-515481, dated May 12, 2015, with English translation (3 pages).
Notice of Reasons for Rejection in Japanese Application No. 2013-524148, dated Jun. 2, 2015, with English translation (7 pages).
Office Action in Chinese Application No. 201180038983.2, dated Feb. 4, 2015, with English translation (14 pages).
Office Action in Korean Patent Application No. 10-2013-7005438, dated Jun. 20, 2017, with English translation (10 pages).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Second Office Action in Chinese Application No. 201180038938.2, dated Oct. 26, 2015, with English translation (5 pages).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Van Nee et al. "The 802.11 n. MIMO-OFDM Standard for Wireless LAN and Beyond," Wireless Personal Communications, vol. 37, pp. 445-453 (Jun. 2006).
Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).
Zhang et al., "Applying Antenna Selection in WLANs for Achieving Broadband Multimedia Communications," *IEEE Trans. on Broadcasting*, vol. 52, No. 4, pp. 475-482 (Dec. 2006).
Zhang et al., "Asynchronous Interference Mitigation in Cooperative Base Station Systems," IEEE Trans. on Wireless Communication, vol. 7, No. 1 (Jan. 2008).
Communication pursuant to Article 94(3) EPC in European Patent Application No. 11754371.2, dated Dec. 5, 2018 (4 pages).

\* cited by examiner

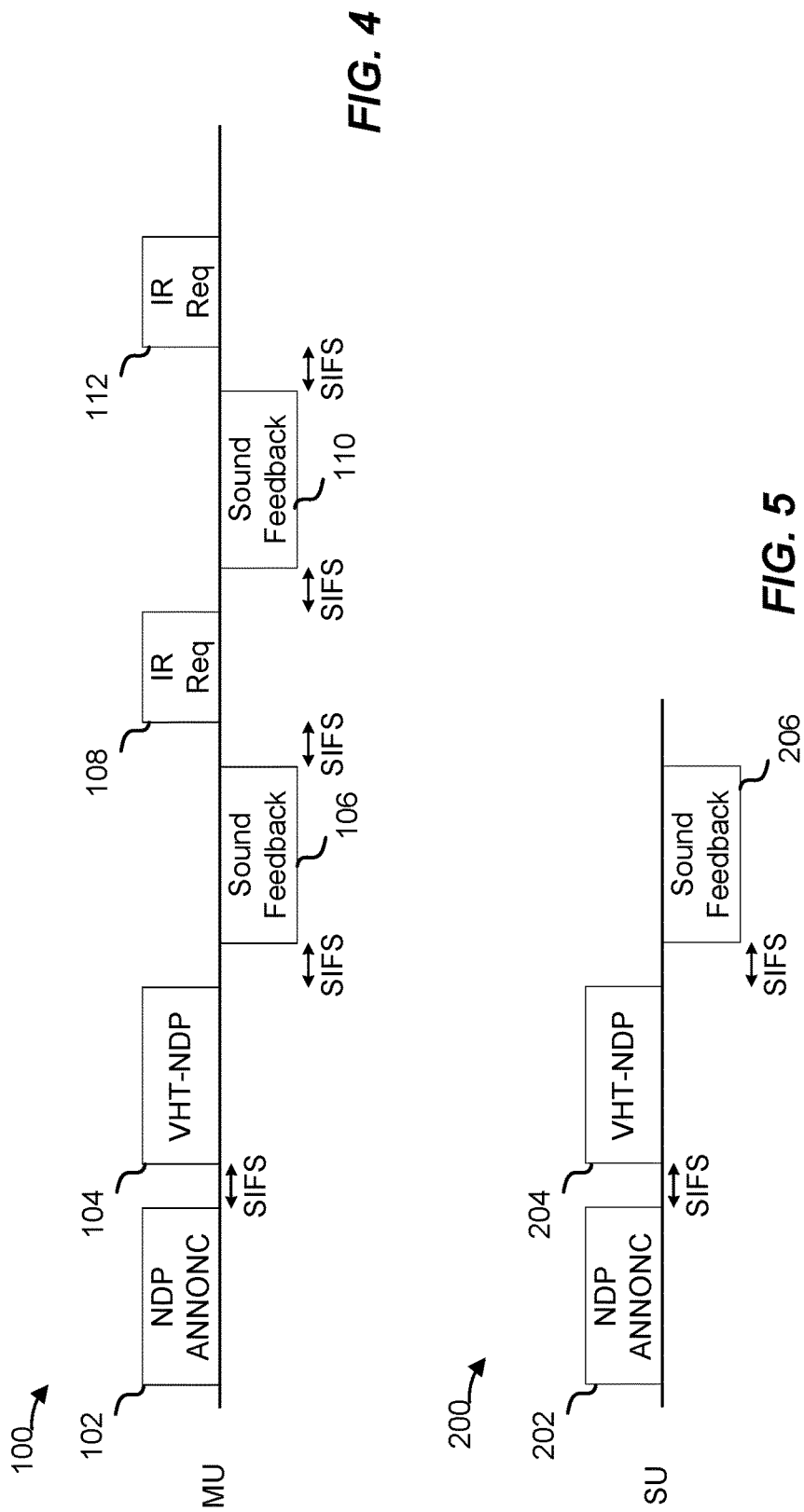

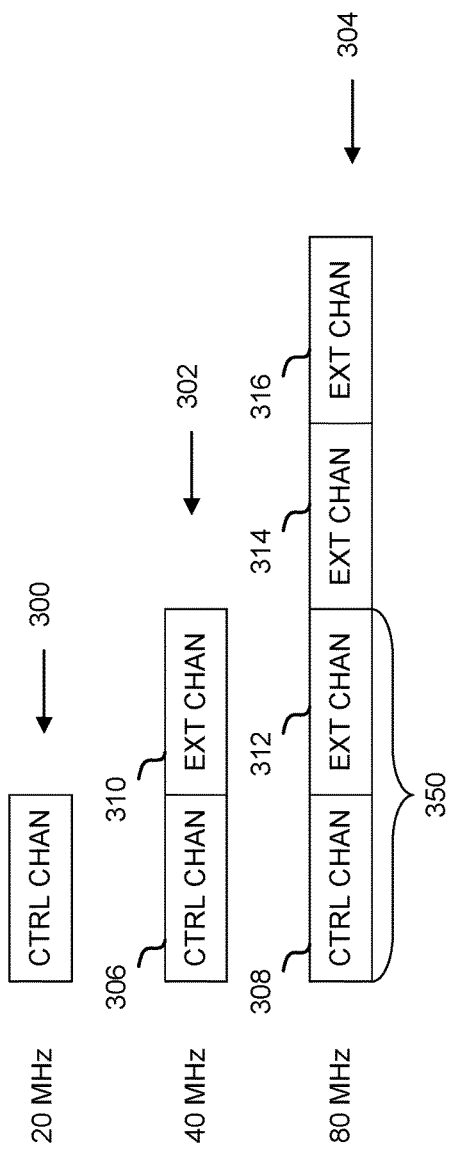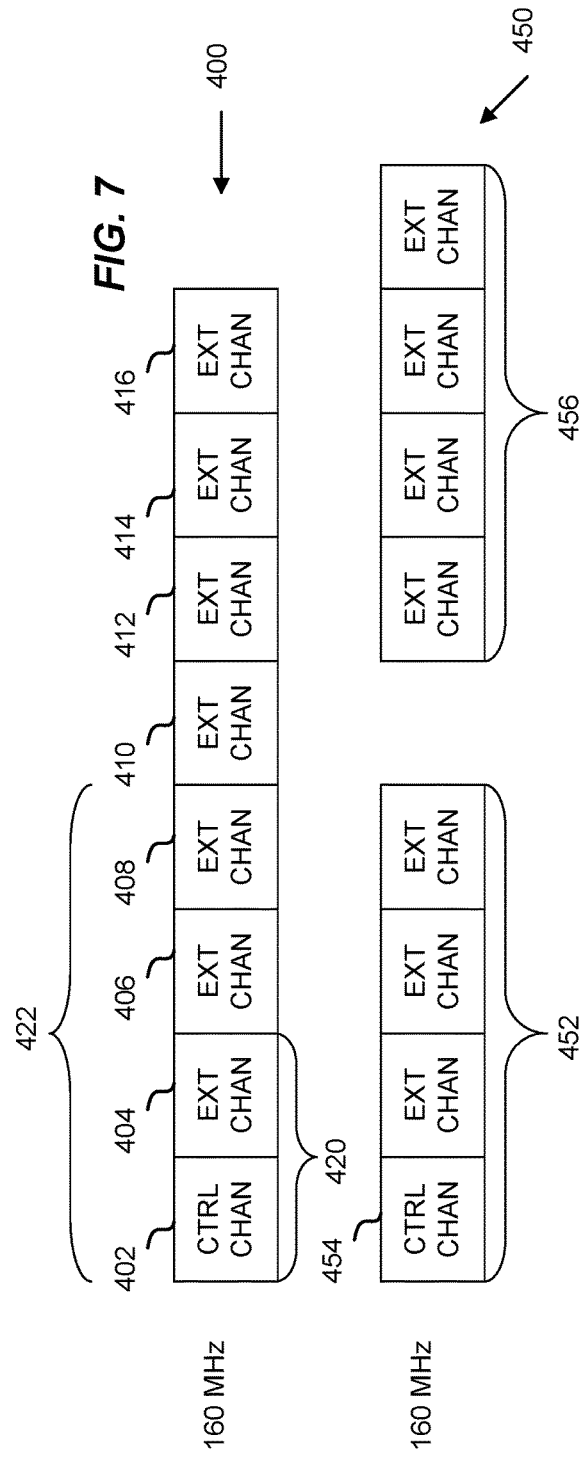

SUB-BAND FEEDBACK FOR BEAMFORMING ON DOWNLINK MULTIPLE USER MIMO CONFIGURATIONS

CROSS-REFERENCES TO RELATED APPLICATION

The present application is a continuation of U.S. application Ser. No. 15/008,618, entitled "Sub-Band Feedback for Beamforming on Downlink Multiple User MIMO Configurations," filed Jan. 28, 2016, which is a continuation of U.S. application Ser. No. 13/205,257, now U.S. Pat. No. 9,252,991, entitled "Sub-Band Feedback for Beamforming on Downlink Multiple User MIMO Configurations," filed Aug. 8, 2011, which claims the benefit of the U.S. Provisional Patent Application No. 61/372,378, entitled "Sub-Band V Feedback for 802.11ac Beamforming and Downlink-Multiuser MIMO," filed on Aug. 10, 2010. All of the applications referenced above are incorporated herein by reference in their entireties.

FIELD OF THE DISCLOSURE

The present application relates generally to communication networks and, more particularly, to beamforming on wireless networks capable of communicating with multiple users simultaneously.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac that will be operated in the 5 GHz bands overlapping with legacy IEEE 802.11a/n systems, and with promises of throughputs exceeding 6.9 Gbps. Unlike the other standards, the IEEE 802.11ac Standard will allow simultaneous communication from an access point to multiple different client stations.

WLANs typically operate in either a unicast mode or a multicast mode. In the unicast mode, an access point (AP) transmits information to one user station at a time. In the multicast mode, the same information is transmitted to a group of client stations concurrently. With IEEE 802.11ac Standard, the multicast mode is able to transmit to multiple client stations at a time.

Antennas and, accordingly, associated effective wireless channels are highly directional at frequencies near or above 60 GHz. When multiple antennas are available at a transmitter, a receiver, or both, it is therefore important to apply efficient beam patterns using the antennas to better exploit spatial selectivity of the corresponding wireless channel.

Generally speaking, beamforming is a signal processing technique for using multiple transmit antennas to produce an output that combines constructively at one or more receive antennas, e.g., by producing an antenna gain pattern having one or more high gain lobes or beams (as compared to the gain obtained by an omni-directional antenna) at the receive antennas, with reduced gain in other directions. If the gain pattern for multiple transmit antennas, for example, is configured to produce a high gain lobe in the direction of a receiver, better transmission reliability can be obtained over that obtained with an omni-directional transmission.

Beamforming requires knowledge of the downstream channel between the access point and each client device. Generally, for protocols like IEEE 802.11a/b/g/n, this means that the access point will receive feedback signals indicative of the downstream channel. However, with IEEE 802.11ac, and protocols that allow for simultaneous communications with multiple client stations, the size (bandwidth) of the downstream channel can be large enough that feedback signals indicative of the entire downstream channel are difficult to produce. A high demand is placed on hardware of the responding client devices called upon to provide feedback on the entire downstream channel.

SUMMARY

In an embodiment, a method in a communication network includes: receiving, at a first communication device, a sounding packet, wherein the sounding packet was transmitted by a second communication device over a communication channel such that the sounding packet spans an entire bandwidth of the communication channel; performing, at the first communication device, a channel estimation on a subchannel block of the communication channel, based on reception of the sounding packet, to determine steering matrix feedback information for the subchannel block, wherein the subchannel block spans a contiguous partial bandwidth of the communication channel and does not span the entire bandwidth of the communication channel, and wherein the steering matrix feedback information does not include steering matrix feedback information for one or more other subchannel blocks of the communication channel that respectively span one or more other respective contiguous partial bandwidths of the communication channel; and transmitting, by the first communication device, a communication frame to the second communication device, the communication frame i) including the steering matrix feedback information for the subchannel block, and ii) not including steering matrix feedback information for the one or more other subchannel blocks of the communication channel.

In another embodiment, an apparatus comprises a transceiver associated with a first communication device, wherein the transceiver is implemented on one or more integrated circuit (IC) devices. The transceiver is configured to: receive a sounding packet, wherein the sounding packet was transmitted by a second communication device over a communication channel such that the sounding packet spans an entire bandwidth of the communication channel. The apparatus also comprises a channel estimation circuit associated with the first communication device, wherein the channel estimation circuit is implemented on the one or more IC devices, and wherein the channel estimation circuit is configured to: perform a channel estimation on a subchannel block of the communication channel, based on reception of the sounding packet, to determine steering matrix feedback information for the subchannel block, wherein the subchannel block spans a contiguous partial bandwidth of the communication channel and does not span the entire bandwidth of the communication channel, and wherein the steering matrix feedback information does not include steering matrix feedback information for one or more other subchannel blocks of the communication channel that respectively span one or more other respective contiguous partial bandwidths of the communication channel. The transceiver is further configured to transmit a communication frame to the second communication device, the communication frame i) including the steering matrix feedback information for the subchannel block, and ii) not including steering matrix feedback information for the one or more other subchannel blocks of the communication channel.

In yet another embodiment, a method includes: transmitting, by a first communication device, a sounding packet to a second communication device over a communication channel such that the sounding packet spans an entire bandwidth of the communication channel; and receiving, at the first communication device, a communication frame from the second communication device, the communication frame responsive to the sounding packet, the communication frame including steering matrix feedback information for a subchannel block of the communication channel. The subchannel block spans a contiguous partial bandwidth of the communication channel and does not span the entire bandwidth of the communication channel, and the communication frame does not include steering matrix feedback information for one or more other subchannel blocks of the communication channel that respectively span one or more other respective contiguous partial bandwidths of the communication channel. The method also includes: using, at the first communication device, the steering matrix feedback information for the subchannel block to identify a steering matrix for use in transmitting to the second communication device; and applying, at the first communication device, the identified steering matrix to only a portion, in frequency, of an information carrying packet, wherein the portion, in frequency, of the information carrying packet corresponds, in frequency, to the subchannel block, and does not correspond, in frequency to the one or more other subchannel blocks of the communication channel.

In still another embodiment, an apparatus comprises a network interface device associated with a first communication device, wherein the network interface device is implemented on one or more integrated circuit (IC) devices. The network interface device is configured to: transmit, via a plurality of antennas, a sounding packet to a second communication device over a communication channel such that the sounding packet spans an entire bandwidth of the communication channel; and receive a communication frame from the second communication device, the communication frame responsive to the sounding packet, the communication frame including steering matrix feedback information for a subchannel block of the communication channel. The subchannel block spans a contiguous partial bandwidth of the communication channel and does not span the entire bandwidth of the communication channel, and the communication frame does not include steering matrix feedback information for one or more other subchannel blocks of the communication channel that respectively span one or more other respective contiguous partial bandwidths of the communication channel. The network interface device also includes a steering vector controller implemented on the one or more ICs, the steering vector controller configured to use the steering matrix feedback information to identify a steering matrix for use in transmitting to the second communication device; and a spatial steering controller implemented on the one or more ICs, the spatial steering controller configured to apply the identified steering matrix to only a portion, in frequency, of an information carrying packet to be transmitted by the first communication device, wherein the portion, in frequency, of the information carrying packet corresponds, in frequency, to the subchannel block, and does not correspond, in frequency to the one or more other subchannel blocks of the communication channel.

BRIEF DESCRIPTION OF THE DRAWINGS

FIG. 4 is a timing diagram of a channel description feedback multiple client station example;

FIG. 5 is a timing diagram of a channel description feedback single client station example;

FIG. 6 is a diagram of data portions from three different IEEE 802.11ac signals, having packet bandwidths 20 MHz, 40 MHz, and 80 MHz, respectively;

FIG. 7 is a diagram of data portions from two different IEEE 802.11ac signals, having packet bandwidths of 160 MHz but in a contiguous and non-contiguous formation;

DETAILED DESCRIPTION

In embodiments described below, a wireless network device such as an access point (AP) of a wireless local area network (WLAN) transmits independent data streams to multiple client stations simultaneously via an antenna array. To reduce interference at a receiving station due to transmissions from the AP to one or more other stations, the AP supports transmit beamforming, in which the AP develops respective transmit (Tx) beamsteering (hereinafter, "steering") vectors for downlink transmissions to each station. In an embodiment, the AP develops a Tx steering vector for a certain client station using only a description of the wireless communication channel between the AP and the station. In some other embodiments, the AP develops the Tx steering vector for a client station by also considering a description of at least one other wireless communication channel between the AP and another station.

To perform this transmit beamforming, the AP relies upon knowledge of the downlink channel between the AP and each client station. This downlink channel knowledge is obtained either through explicit beamforming, where the client device receives a sounding packet from the AP, develops steering vectors for the downlink channel, and transmits those steering vectors back to the AP, or through implicit beamforming, in which the client device sounds the reverse link of the downlink channel and the AP determines the steering vectors based on that sounding. In either case, the AP uses such downlink information as "channel descriptions" from which the AP will apply steering vectors for transmit beamforming.

Explicit beamforming typically uses one of three types of feedback channel descriptions. With channel state information (CSI) feedback, the client station estimates the downlink channel from a sounding packet from the AP and feeds back the estimated channel gains. With uncompressed steering matrix feedback, the client station, based on the channel estimate from a sounding packet from the AP, determines the steering matrix that is to be used at the AP. The client station then feeds back this steering matrix, without compression. With compressed steering matrix feedback, a similar process occurs, but the steering matrix is fed back in a compressed form.

Figure 1:
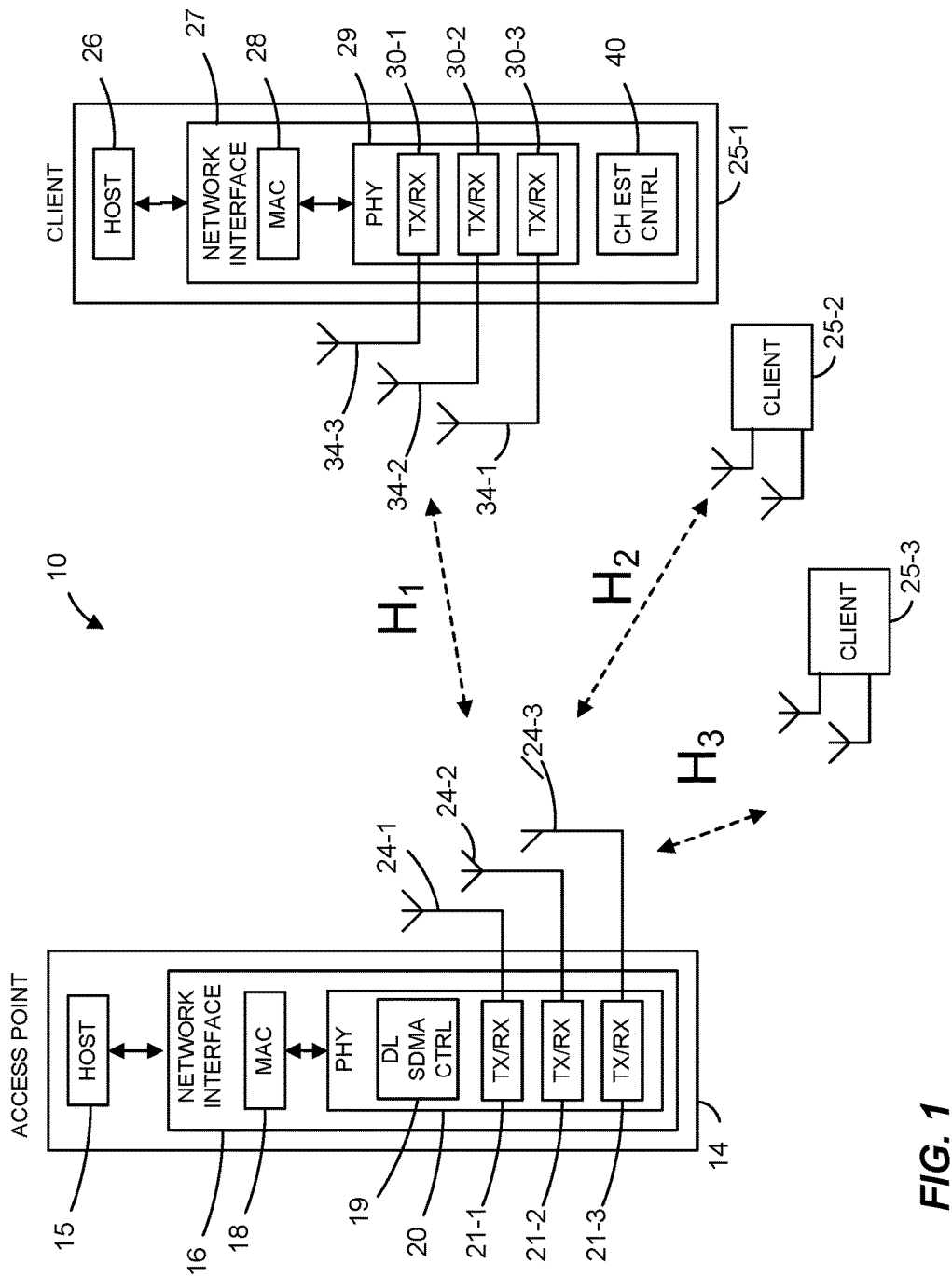
FIG. 1 a block diagram of an example wireless local area network (WLAN) in which an access point (AP) utilizes downlink (DL) Spatial-Division Multiple Access (SDMA) steering techniques in accordance with an embodiment of the present disclosure.
Figure 2:
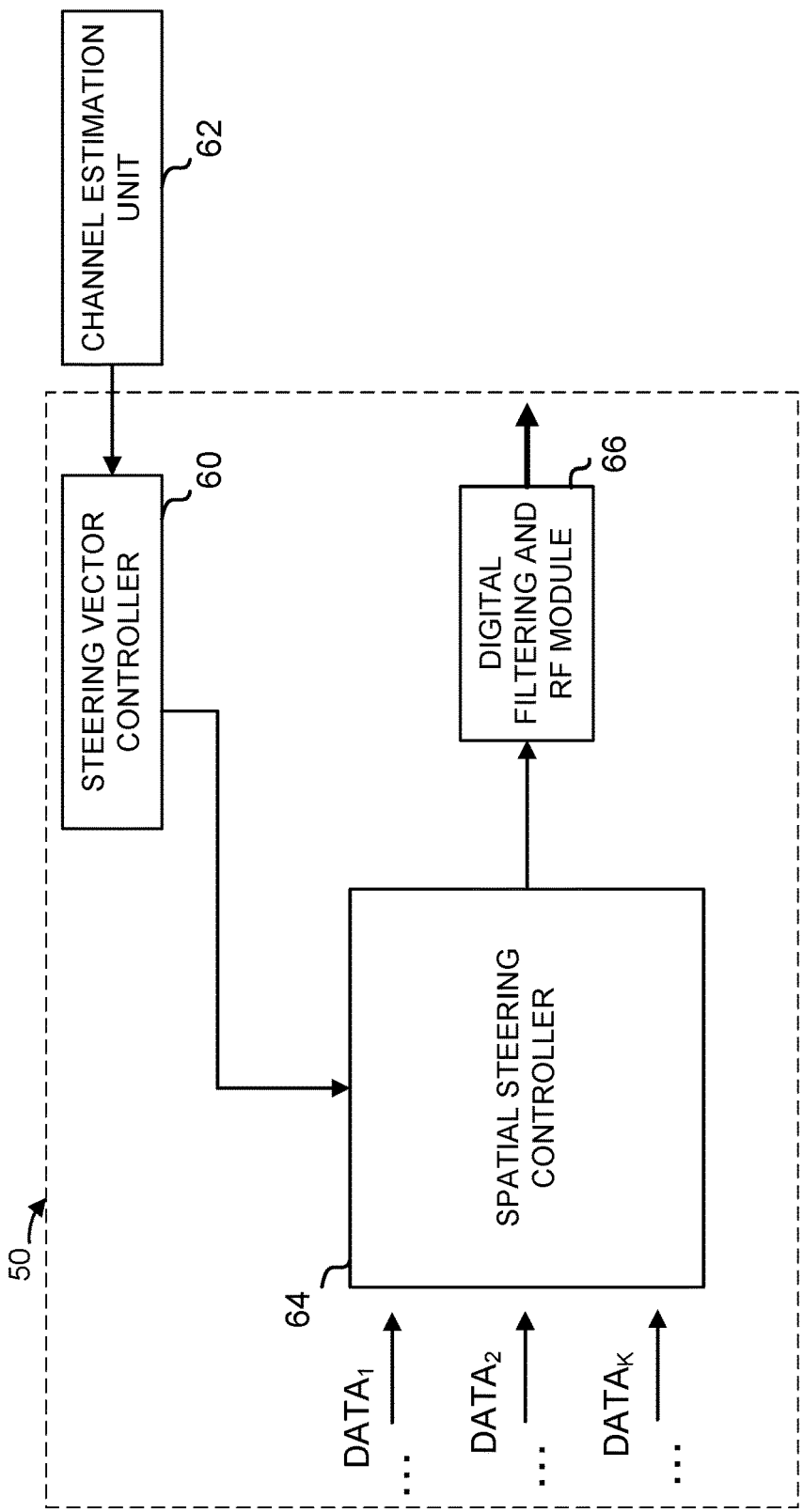
FIG. 2 is a block diagram of a DL SDMA controller at an access point and working in conjunction with a channel estimation unit at a client station, according to an embodiment.

For the IEEE 802.11ac Standard, the AP is to support multiple user MIMO configurations, as discussed further in regards to FIGS. 1 and 2, in which the AP is able to use the downlink transmission to simultaneously transmit distinct signals to multiple intended client stations. For such MU-MIMO operation, all downlink channels may have the same bandwidth. Further, each client station may have knowledge of the number of streams (within each downlink channel) being transmitted to the other client stations, as well as the modulation and coding scheme (MCS) values used at the AP for those other client stations. In this way, there need not be any coordination or collaboration between the client stations; instead, the transmit beamforming of the AP is used to simultaneously communicate with the different client stations and to do so in a way that attempts to minimize interference between the signals received at each client station.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes $N_T$ transceivers 21, and the transceivers are coupled to $N_T$ antennas 24. Although three transceivers 21 and three antennas 24 are illustrated in FIG. 1 (i.e., $N_T$=3), the AP 14 can include different numbers (e.g., $N_T$=2, 4, 5, 6, 7, 8, etc.) of transceivers 21 and antennas 24 in other embodiments. The PHY unit 20 also includes a downlink (DL) Spatial-Division Multiple Access (SDMA) controller 19 that implements one or several of the techniques for developing steering vectors described herein.

The WLAN 10 includes K client stations 25, each station 25-$i$ equipped with $N_i$ antennas. Although three client stations 25 are illustrated in FIG. 1 (i.e., K=3), the WLAN 10 can include different numbers (e.g., K=2, 4, 5, 6, etc.) of client stations 25 in various scenarios and embodiments. Two or more of the client stations 25 are configured to receive corresponding data streams having been simultaneously transmitted from the AP 14.

A client station 25-1 includes a host processor 26 coupled to a network interface 27. The network interface 27 includes a MAC unit 28 and a PHY unit 29. The PHY unit 29 includes $N_1$ transceivers 30, and the $N_1$ transceivers 30 are coupled to $N_1$ antennas 34. Although three transceivers 30 and three antennas 34 are illustrated in FIG. 1 (i.e., $N_1$=3), the client station 25-1 can include different numbers of transceivers 30 and antennas 34 (e.g., $N_1$=1, 2, 4, 5, etc.) in other embodiments. The PHY unit 27 may include, in some embodiments, a channel estimation controller 40 that implements portions of the techniques for developing steering vectors described herein. The client stations 25-2 and 25-3 have a structure that is the same as or generally similar to the client station 25-1. In an embodiment, each of the client stations 25-2 and 25-3 is structured like the client station 25-1 but has only two transceivers and two antennas (i.e., $N_2$=$N_3$=2). In other embodiments, the client stations 25-2, and 25-3 can include different numbers of antennas (e.g., 1, 3, 4, 5, 6, 7, 8, etc.). Although, only an example implementation, in the IEEE 802.11ac Standard, it is believed that the AP will have up to 8 antennas and support simultaneously communication with up to 4 stations.

In the illustrated embodiment, the AP 14 is configured to transmit multiple spatial streams simultaneously to the client stations 25-1, 25-2, and 25-3, so that each of client stations 25-$i$ receives data via $L_i$ spatial streams. For example, the client station 25-1 receives data via three (i.e., $L_1$=3) spatial streams. Although in this example $L_1$=$N_1$, a client station 25-$i$ in general can utilize fewer spatial streams than the number of antennas with which the client station 25-$i$ is equipped. Further, when space-time coding is employed, the multiple spatial streams are sometimes referred to as space-time streams. If the number of space-time streams is less than the number of transmit chains, spatial mapping is employed, in some embodiments.

In an embodiment, the AP 14 communicates with the client station 25-1 over a multiple input, multiple output (MIMO) channel defined, at the one end, by the array including the antennas 24-1, 24-2, and 24-3 and, at the other end, by the array including the antennas 34-1, 34-2, and 34-3. For this example, the MIMO channel can be described by a three-by-three channel matrix $H_1$ that specifies, in each element, a channel gain parameter for a stream defined by the corresponding transmit antenna and a receive antenna and a channel phase between the corresponding pairs of antennas. Similarly, the AP communicates with the clients 25-2 and 25-3 via MIMO channels described by matrices $H_2$ and $H_3$, respectively. In at least some embodiments, the dimensionality of a matrix $H_i$ describing a MIMO channel between the AP 14 and a client station 25-$i$ is $N_i \times N_T$.

For protocols like IEEE 802.11n, which support transmit beamforming in an optional mode, or protocols like IEEE 802.11ac, which support transmit beamforming to multiple users simultaneously, the AP 14 will steer the downlink channel, described by the channel descriptor, $H_i$, to an intended receiver station using the one or more spatial streams ($L_1$), where such steering improves the signal-to-noise ratio at the intended station.

With respect to FIG. 1, to develop the steering matrices for each station, the system can be modeled as though the AP 14 is transmitting a symbol to a client station 25-$i$ as a transmit symbol vector xi of dimensionality $L_i \times 1$, and the client station 25-$i$ receives a signal that can be represented as a vector yi of dimensionality $N_i \times 1$.

Therefore, in an embodiment, communication is modeled as though the AP 14 would apply a respective steering vector $W_1$ of dimensionality $N_T \times L_i$ to a transmit symbol vector xi for transmitting the signal via the corresponding channel $H_1$. Thus, when the AP 14 simultaneously transmits data to stations 25-1, 25-2, . . . 25-K, the signal received at the client station 25-$i$ can be expressed as $$y_i = \underbrace{H_i W_i x_i}_{\text{intended}} + \underbrace{H_i \sum_{k \neq i} W_k x_k}_{\text{interference}} + \underbrace{n_i}_{\text{noise}} \quad \text{(Eq. 1)}$$

As illustrated by Eq. 1, the received signal would include an intended component, an interference component due to signals intended for other client stations, and a noise component (expressed as a vector $n_i$ of dimensionality $N_i \times 1$). Eq. 1 also can be written as $$\begin{aligned} y_i &= H_i W_i x_i + H_i \sum_{k \neq i} W_k x_k + n_i \\ &= H_i [W_1 \ W_2 \ \ldots \ W_K] \begin{bmatrix} x_1 \\ x_2 \\ \vdots \\ x_K \end{bmatrix} + n_i \\ &= H_i W x + n_i, \\ i &= 1 \ldots K \end{aligned} \quad \text{(Eq. 2)}$$

where $$W = [W_1 \ W_2 \ \ldots \ W_K], \ x = \begin{bmatrix} x_1 \\ x_2 \\ \vdots \\ x_K \end{bmatrix}$$

Further, the signals $y_1, y_2, \ldots y_K$ can be "stacked" together to define an aggregate receive vector y:

$$y = \begin{bmatrix} y_1 \\ y_2 \\ \vdots \\ y_K \end{bmatrix} = H_T W = \begin{bmatrix} x_1 \\ x_2 \\ \vdots \\ x_K \end{bmatrix} + \begin{bmatrix} n_1 \\ n_2 \\ \vdots \\ n_K \end{bmatrix} = H_W x + n \quad \text{(Eq. 3)}$$

where $$H_T = \begin{bmatrix} H_1 \\ H_2 \\ \vdots \\ H_K \end{bmatrix},$$

$$H_W = \begin{bmatrix} H_1 W_1 & H_1 W_2 & \ldots & H_1 W_K \\ H_2 W_1 & H_2 W_2 & \ldots & H_2 W_K \\ \vdots & \vdots & \vdots & \vdots \\ H_K W_1 & H_K W_2 & \ldots & H_K W_K \end{bmatrix}, \text{ and } n = \begin{bmatrix} n_1 \\ n_2 \\ \vdots \\ n_K \end{bmatrix}.$$

In an implicit beamforming example, the DL SDMA controller 19 may develop the aggregate steering matrix W (that includes the individual vectors $W_i, W_2, \ldots W_K$) so as to achieve a configuration optimal for the overall group of K client stations 25, i.e., with a reduction in the interference between the AP and each station, based on simultaneous communications with the other stations. For example, the DL SDMA controller 19 may use channel information ("channel descriptions") to reduce interference for some or all of the users by optimizing any suitable metric.

In an explicit beamforming example, these techniques may be partially or wholly implemented at one or more of the client stations 25-i, i.e., in the channel estimation controller 40. For example, the channel estimation controller 40 at the client stations may determine the steering matrix W for the downlink channel between the access point and the respective client station.

Example implementations are discussed below.

Referring to FIG. 2, an SDMA controller 50 illustrates operation of the DL SDMA controller 19 in an explicit beamforming configuration, where the channel information is determined at a client station. Generally, a steering vector controller 60 receives channel descriptions from a channel estimation unit 62 and provides resulting steering vectors $W_1, W_2, \ldots W_K$ to a spatial steering unit 64, which applies a respective steering vector $W_i$ to each transmit symbol vector xi. In the explicit beamforming example of FIG. 2, the channel estimation unit 62 is at the client station, e.g., at the channel estimation controller 40 of the client station 25-1.

In operation, to perform transmit beamforming to each of the client stations 25-i, a digital filtering and RF module 66 receives a sounding packet signal from the spatial steering unit 64. That sounding packet is transmitted either to multiple client stations or to a single client station. In response, and as discussed further below, the channel estimation unit 62 develops a partial channel estimation, i.e., a channel description, for the physical downlink channel between the AP 14 and the respective client station 25-i. In some embodiments, the channel description includes channel gain parameters (which may be complex numbers) for various streams defined by transmit and receive antennas. In some such examples, the channel description is represented in a matrix format, either uncompressed or compressed. While in some embodiments, the channel estimation unit 62 performs measurement of one or several parameters associated with the physical channel to develop CSI or another metric that is sent back to the AP 14 and then used by the steering vector controller 60 to determine steering vectors $W_i, W_2, \ldots W_K$. In general, the channel estimation unit 62 can implement any suitable technique for developing channel descriptions. For example, when calculating steering vectors/matrix for a multiple-user (MU) communication, a zero-forcing (ZF) technique, a minimum mean square error (MMSE) technique, a leakage suppression (LS) technique, or a block nullification (BN) technique may be used. In embodiments where the AP 14 is only communicating with a single client station, a single-user beamforming (SU-BF) technique may be used.

Figure 3:
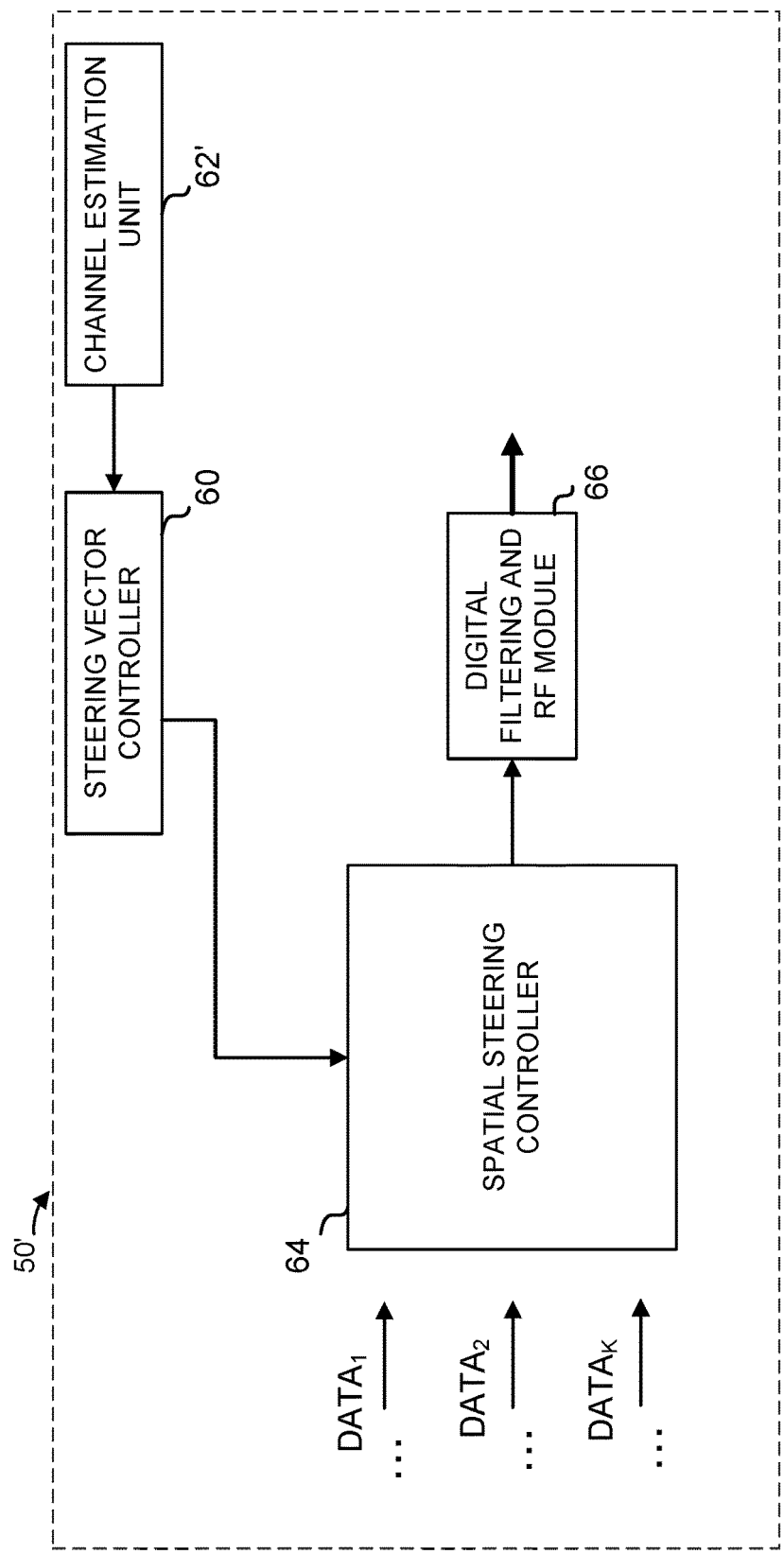
FIG. 3 is a block diagram of a DL SDMA controller that is used in an AP that implements steering techniques of the present disclosure, according to an embodiment.

FIG. 3 illustrates a similar configuration (labeled 50') to that of FIG. 2—and therefore like reference numerals are used—except used for implicit beamforming, in which the channel estimation unit 62' is implemented at the AP 14. In an embodiment, in response to receipt of a downlink signal, each station 25-i sends an reverse channel sounding packet to the AP 14, which sounding packets are received at the channel estimation unit 62'. For example, immediately upon receipt of the sounding packet, the client station 25-i will determine the bandwidth of the sounding packet and send a reverse channel sounding packet having a smaller bandwidth, and corresponding to subchannels of the initial sounding packet. The channel estimation unit 62' receives that reverse channel sounding packet and performs partial channel estimation of the downlink channel. The channel estimation unit 62' communicates that estimation with the steering vector controller 60 directly; and the controller 60 determines the steering vectors for each client station and communicates those to the spatial steering unit 64. Thus, in an example implicit beamforming embodiment, the channel estimation unit 62' at the AP 14 estimates the downlink channel based on the received uplink sounding packets from the stations 25-i, and without a feedback signal.

In either explicit beamforming or implicit beamforming, for the present embodiments, the channel description or reverse-link sounding packet, respectively, spans only over a portion of the entire downlink channel.

FIG. 4 illustrates an example timing diagram of a channel description feedback for transmit beamforming a downlink channel to multiple users. The AP 14 transmits, to all client stations, a null data pack (NDP) sounding packet 100 containing a header frame having an NDP announcement frame 102 and a very high throughput (VHT) null data packet control frame (VHT-NDP) 104, spaced apart by a short interframe space (SIFS).

In response to receiving the NDP sounding packet 100, the client station 25-i, in particular channel estimation unit 62, in an explicit beamforming example, examines a portion of the received NDP sounding packet 100 and determines a channel description for that examined portion. Specifically, in some embodiments, the channel estimation unit 62 determines a CSI feedback over the examined portion of the NDP sounding packet 100, while in other examples, the unit 62 determines an uncompressed or compressed steering matrix feedback over the portion.

The client station 25-i then transmits, after a SIFS period, the partial channel estimation feedback frame 106 to the AP 14. The AP 14 receives the partial channel estimation feedback frame 106 and determines an immediate response (IR) request frame 108 which is sent to indicate to the next client station to provide its partial channel estimation feedback frame 110, which is then sent to the original client device 25-i, after a SIFS period. The process repeats with the next IR request frame 112, until all client devices have responded.

FIG. 5 illustrates an example timing diagram of a channel description feedback for transmit beamforming a downlink channel to a single user (SU-BF). The AP 14 transmits a null data pack (NDP) sounding packet 200 containing an NDP announcement frame 202 and a VHT-NDP frame 204, spaced by a SIFS period. In response, the client station examines a portion of the NDP sounding packet to determine the partial channel estimation (CSI feedback, compressed steering matrix, or uncompressed steering matrix), which the client station sends back as the partial channel estimation frame 206.

Packet bandwidths in an IEEE 802.11ac frame, which can vary depending on the AP and the client station, and are formed at 20, 40, 80, or 160 MHz, where the 160 MHz bandwidth packet can be contiguous or non-contiguous.

FIG. 6 illustrates examples of data packets, e.g., the VHT-NDP frames 104 and 204, of a 20 MHz, 40 MHz, and 80 MHz size. A 20 MHz data packet 300 is formed of a 20 MHz wide control channel, or primary channel. Each of the 40 MHz data packet 302 and the 80 MHz data packet 304 also include a 20 MHz control channel 306 and 308, respectively. The data packet 302 further includes a 20 MHz subband extension channel 310; and the data packet 304 further includes three 20 MHz subband extension channels 312, 314, and 316. While the control channels 302, 306, and 308 are illustrated as located at the same least significant bit (LSB) locations for each of the data packets 300, 302, and 304, in other examples, the data packets may be in other locations. In any of the different bandwidths, a 20 MHz control channel subband will be present.

FIG. 7 illustrates a 160 MHz contiguous data packet 400 containing a 20 MHz control channel 402 and contiguous extension channels 404-416. FIG. 7 also illustrates a similar, but non-contiguous 160 MHz data packet 450, having a first 80 MHz packet 452, containing the control channel 454, and a second 80 MHz packet 456 spaced from the first packer 452.

The higher bandwidth of these IEEE 802.11ac data packets and the desire to provide an immediate channel estimation feedback, i.e., within the SIFS period, along with the larger number of transmit antennas used for MU-MIMO communications, means that full channel estimation is difficult. Therefore, as discussed above, the client station feedbacks on only a portion of the received NDP sounding packet, more specifically over a subchannel block of the full data packet bandwidth. This partial channel estimation occurs whether the feedback is a CSI estimation or a compressed or uncompressed steering matrix. The partial channel estimation may be based on the control channel, in some examples, or based on any sub-channel in other examples.

Figure 8:
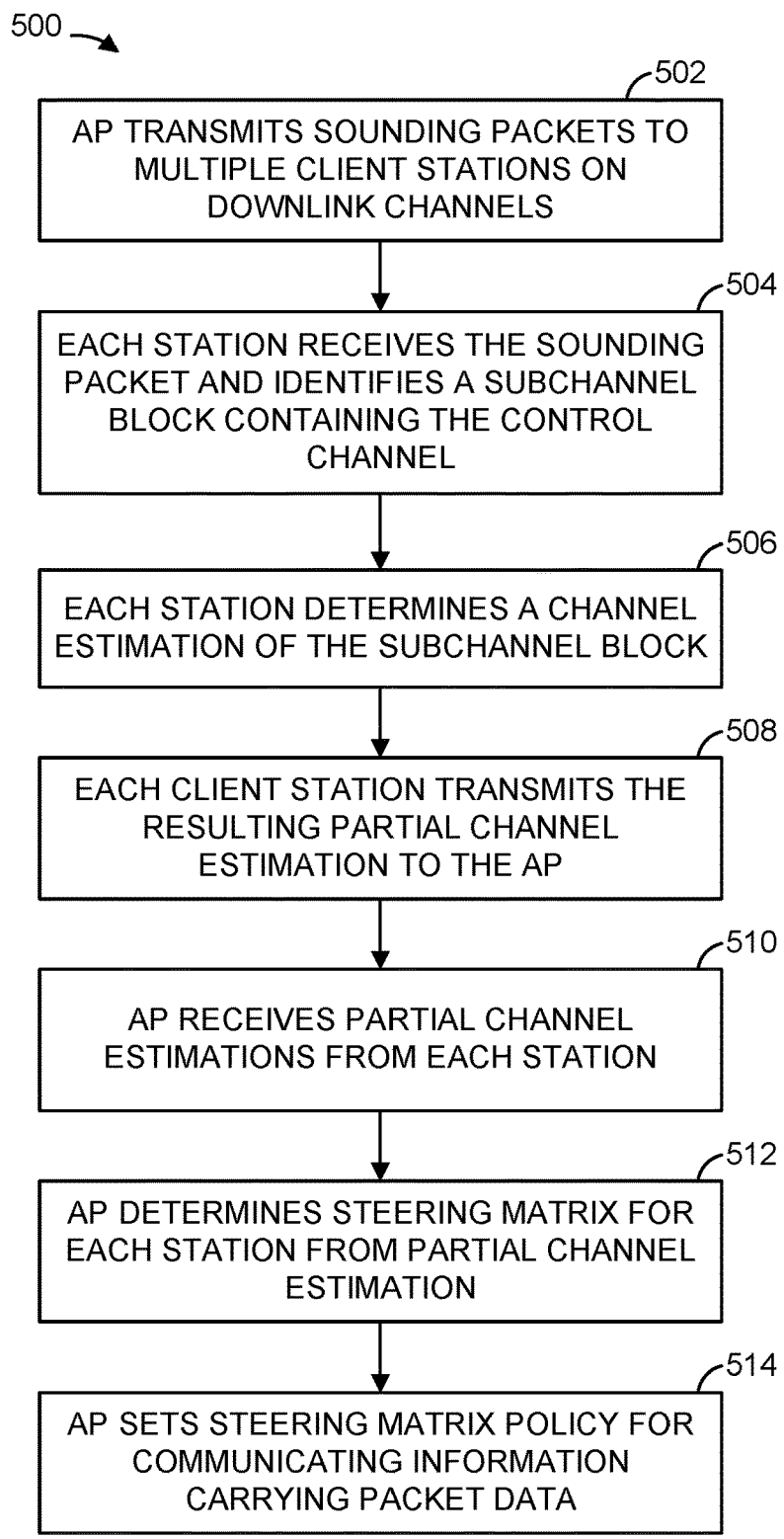
FIG. 8 illustrates an example method for performing a partial channel estimation and feedback in either an explicit beamforming or implicit beamforming configuration, according to an embodiment.

FIG. 8 illustrates an example method 500 for performing a sub-channel channel estimation and feedback on a control channel of an IEEE 802.11ac data packet. At a block 502, the AP 14 transmits a NDP sounding packet to each of the client stations 25-i on the network. At a block 504, a client station receives the NDP sounding packet and identifies a subchannel block which contains the control channel. Each client station, at a block 506, determines a channel estimation of that subchannel block, by determining a CSI or a compressed or uncompressed steering matrix of that portion. The client station then sends a partial channel estimation feedback signal to the AP 14 at a block 508.

To implement the block 504, and in reference to FIGS. 6 and 7, for the 20 MHz data packet 300, the block 504 identifies the full channel for channel estimation. For the 40 MHz data packet 302, the block 504 identifies the 20 MHz control channel 306, so that the client station does not provide channel estimation based on the extension channel 310. For the 80 MHz data packet 304, in some examples, the block 504 identifies a LSB 40 MHz subchannel block 350, which contains the control channel 306 and provides this portion to the block 506 for channel estimation. For the contiguous 160 MHz data packet 400, in some examples, the block 504 identifies a 40 MHz subchannel block 420 for channel estimation. In other examples, the block 504 identifies a larger 80 MHz subchannel block 422 for channel estimation. The block 504 may perform the same function for the non-contiguous 160 MHz data packet 450, identifying a 40 MHz subchannel block 452 or an 80 MHz subchannel block 456. While example subchannels are described, the process 500 is not limited to performing channel estimation on these subchannels. Rather any subchannel block of the full data packet may be identified and estimated, where in the illustrated example, that portion also includes the control channel.

The channel estimation feedback, from block 508 includes a control frame identifying the width of subchannel block used for determining the partial channel estimation. In some examples, the feedback includes a MIMO Control Field that indicates the total bandwidth of the partial channel estimation, 20, 40, or 80 MHz. From this Control Field, the AP 14 can determine which portion of any data packet to the client station is to receive the steering matrix, because the bandwidth is determined starting with the location of the control channel. For example, a MIMO Ctrl Field would have an extended Bandwidth Subfield that is 2 bits long, indicating one of 20, 40, 80, or 160 MHz as the bandwidth of the channel estimation. In the example of 160 MHz, the channel estimation has been performed on the entire NDP sounding packet.

At a block 510 of the process 500, the AP 14 receives the partial channel estimation and, at a block 512, determines the steering matrices for the transmitting client station. For example, for an explicit beamforming partial channel estimation, the steering vector controller 60 stores an uncompressed steering matrix from the client station or uncompresses (expands) and then stores the uncompressed steering matrix. If a CSI feedback is transmitted as the partial channel estimation, then the steering vector controller 60 determines the steering matrix based on the CSI feedback. In an implicit beamforming, the block 512 receives the partial reverse link sounding packet to the channel estimation unit 62' at the AP 14; and the channel estimation unit 62' determines the channel estimation which is provided to the steering vector controller 60' which then determines the steering matrix for the transmitting client station.

At a block 514, steering vector controller 60 sets the steering matrix policy for the AP 14. When the AP 14 is to transmit to a particular client station over a partial data packet corresponding to the subchannel block identified by block 504, steering vector controller 60 applies the steering matrix identified in the partial channel estimation or derived from the partial channel description. For the illustrated example, the partial steering matrix is therefore applied when the AP 14 is transmit a partial data packet containing a control channel and extensions that correspond to the original subchannel block.

If the AP 14 is to send a data packet having a bandwidth larger than the original subchannel block, including the full bandwidth of the data packet, then at the block 514, the spatial steering unit 64 will apply the steering matrix determined from the partial channel estimation to only a portion of the data packet, in particular the LSB portion of the data packet corresponding to the original subchannel block. For example, for the contiguous 160 MHz data packet 400, with the original subchannel block 420, if the AP 14 is transmitting to a client station on only the first 40 MHz of the data packet, then the spatial steering unit 64 is to apply the steering matrix from the partial channel estimation to the entire data packet (because the first 40 MHz also correspond to the subchannel block 420). If, however, the data packet is larger than 40 MHz, for example 80 MHz (corresponding to block 422) or 160 MHz (corresponding to the entire data packet 400), then the spatial steering unit 64 applies the steering matrix from block 512 to only the LSB 40 MHz portion 422 and the remaining extension sub-channels are broadcast without application of steering matrices or application of a default steering matrixes stored on the AP 14. For another example, if the data packet's bandwidth is larger than the bandwidth of the steering matrices, the AP may choose not to apply the steering matrices across all the packet bandwidth. When there is only one client being involved, then the process in FIG. 8 represents the sub-band beamforming for the case of SU-TxBF.

Figure 9:
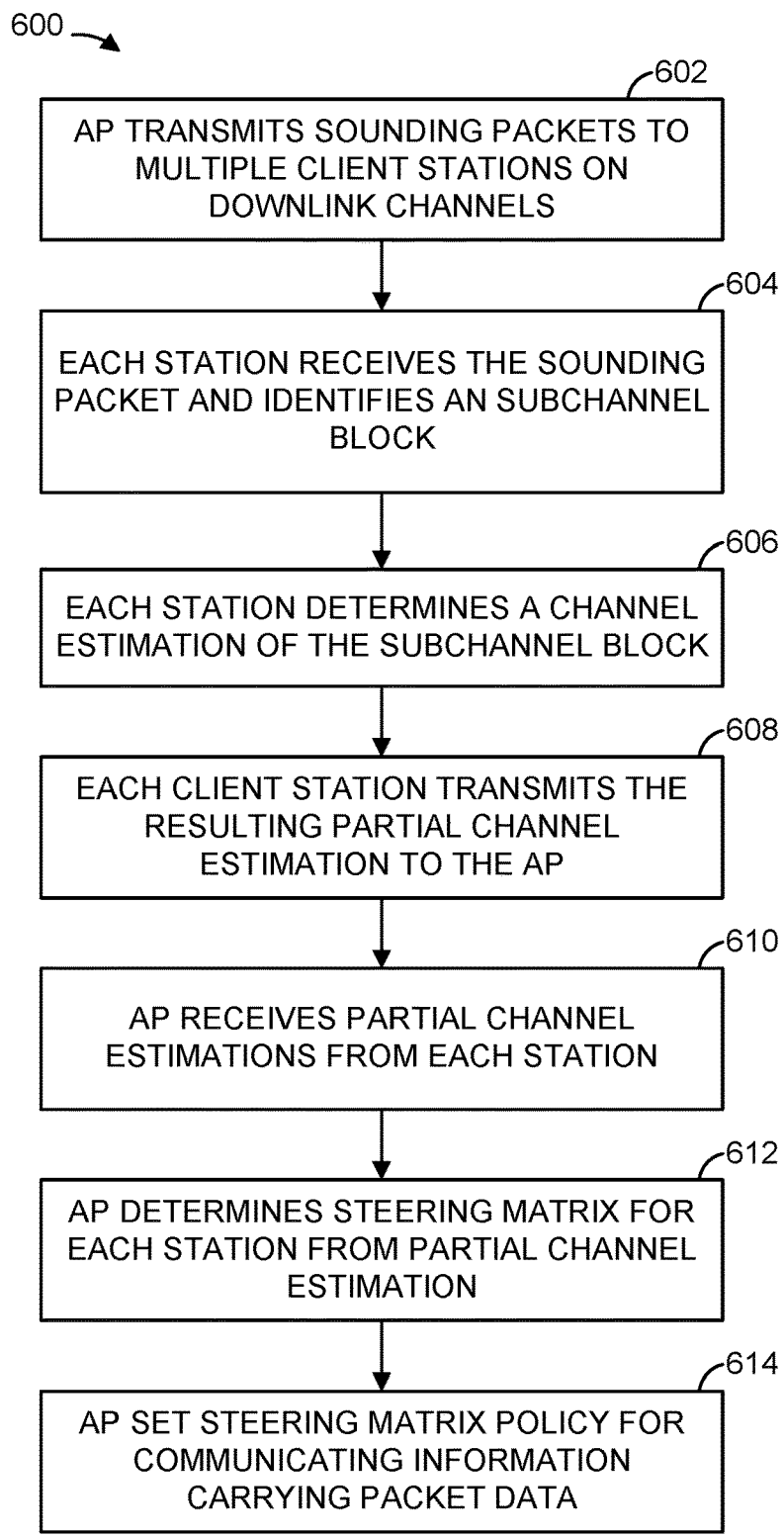
FIG. 9 illustrates an example method for performing a partial channel estimation and feedback in either an explicit beamforming or implicit beamforming configuration, according to another embodiment.
Figure 10:
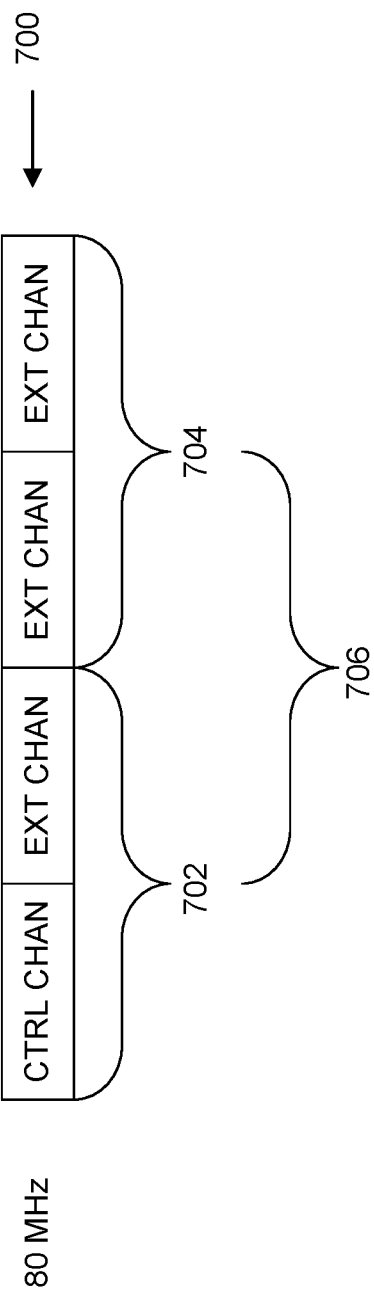
FIG. 10 is a diagram of data portions of an IEEE 802.11ac signal having an 80 MHz packet bandwidth and showing all combinations of subchannel blocks as may be identified by the method of FIG. 9.

FIG. 9 illustrates another example method 600 for performing a sub-channel channel estimation and feedback on a control channel of an IEEE 802.11ac data packet. At a block 602, the AP 14 transmits a NDP sounding packet to each of the client stations 25-i on the network. At a block 604, a client station receives the NDP sounding packet and identifies any subchannel block thereof. That is, unlike the process 500, the process 600 can perform partial channel estimation on any portion of data packet. FIG. 10, for example, illustrates an 80 MHz data packet 700. The block 604 may identify any of three different 40 MHz subchannel blocks 702, 704, and 706. In some examples, the block 604 is configured to only identify the LSB subchannel block 702 or the upper significant bit (USB) subchannel block 704, and not the intermediate subchannel block 706.

The client station, at a block 606, then determines a channel estimation of that subchannel block, by determining a CSI or a compressed or uncompressed steering matrix of that portion. The client station then sends a channel estimation feedback signal to the AP 14 at a block 608.

For the process 600, the channel estimation feedback signal is to include a control frame that indicates which of all possible combinations of subchannels was used for the partial channel estimation. In some examples, the control frame is an MIMO Control Field of the channel estimation feedback that has a bit length long enough to identify each combination of subchannels, i.e., greater than 2 bits in length. In some examples, an 8 bit control field is used, representing each of the up to eight 20 MHz subchannels.

At a block 610, the AP 14 receives the partial channel estimation and, at a block 612, determines the steering matrices for the transmitting client station, both in a similar manner to that of FIG. 5. The steering matrix policy setting of block 614, however, is different from that of block 514. For the block 614, the steering vector controller 60 sets a steering matrix policy whereby whenever the transmitted signal on the downstream channel either fully or partially corresponds to the original subchannel block of the NDP sounding packet, the AP 14 will apply the steering matrix determined from the partial channel estimation. That is, even if the data packet to be transmitted is larger than the original subchannel block, if that data packet includes, at least partially, the original subchannel block, the steering matrix is applied. The block 614 will apply the steering matrix if the data packet exactly matches the subchannel block. Further, if the entire data packet is to be used, the block 614 determines that the spatial steering unit 64 is to apply the steering matrix over that portion of the data packet corresponding to the original subchannel block. For another example, if the data packet's bandwidth is larger than the bandwidth of the steering matrices, the AP may choose not to apply the steering matrices across all the packet bandwidth. When there is only one client being involved, then the process in FIG. 9 also represents the sub-band beamforming for the case of SU-TxBF.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention. For example, one or more operations in methods discussed above may be performed in a different order (or concurrently) and still achieve desirable results.

What is claimed is:

1. A method in a communication network, the method comprising:
    receiving, at a first communication device, a sounding packet, wherein the sounding packet was transmitted by a second communication device over a communication channel such that the sounding packet spans an entire bandwidth of the communication channel;
    performing, at the first communication device, a channel estimation on a subchannel block of the communication channel, based on reception of the sounding packet, to determine steering matrix feedback information for the subchannel block, wherein the subchannel block spans a contiguous partial bandwidth of the communication channel and does not span the entire bandwidth of the communication channel, and wherein the steering matrix feedback information does not include steering matrix feedback information for one or more other subchannel blocks of the communication channel that respectively span one or more other respective contiguous partial bandwidths of the communication channel; and
    transmitting, by the first communication device, a communication frame to the second communication device, the communication frame i) including the steering matrix feedback information for the subchannel block, and ii) not including steering matrix feedback information for the one or more other subchannel blocks of the communication channel.

2. The method of claim 1, wherein the sounding packet is a null data packet (NDP) sounding packet.

3. The method of claim 1, wherein:
    the steering matrix feedback information for the subchannel block includes information corresponding to a compressed steering matrix that corresponds to the subchannel block; and
    the communication frame includes the information corresponding to the compressed steering matrix.

4. The method of claim 1, wherein:
    the steering matrix feedback information for the subchannel block includes information corresponding to an uncompressed steering matrix that corresponds to the subchannel block; and
    the communication frame includes the information corresponding to the uncompressed steering matrix.

5. The method of claim 1, wherein one of:
    a packet bandwidth of the sounding packet is 40 megahertz (MHz) and the subchannel block spans 20 MHz;
    the packet bandwidth of the sounding packet is 80 MHz and the subchannel block spans 40 MHz;
    the packet bandwidth of the sounding packet is 160 MHz and the subchannel block spans 80 MHz; or
    the packet bandwidth of the sounding packet is 160 MHz and the subchannel block spans 40 MHz.

6. An apparatus, comprising:
    a transceiver associated with a first communication device, wherein the transceiver is implemented on one or more integrated circuit (IC) devices, and wherein the transceiver is configured to:
        receive a sounding packet, wherein the sounding packet was transmitted by a second communication device over a communication channel such that the sounding packet spans an entire bandwidth of the communication channel;
    a channel estimation circuit associated with the first communication device, wherein the channel estimation circuit is implemented on the one or more IC devices, and wherein the channel estimation circuit is configured to:
        perform a channel estimation on a subchannel block of the communication channel, based on reception of the sounding packet, to determine steering matrix feedback information for the subchannel block, wherein the subchannel block spans a contiguous partial bandwidth of the communication channel and does not span the entire bandwidth of the communication channel, and wherein the steering matrix feedback information does not include steering matrix feedback information for one or more other subchannel blocks of the communication channel that respectively span one or more other respective contiguous partial bandwidths of the communication channel;
    wherein the transceiver is further configured to:
        transmit a communication frame to the second communication device, the communication frame i) including the steering matrix feedback information for the subchannel block, and ii) not including steering matrix feedback information for the one or more other subchannel blocks of the communication channel.

7. The apparatus of claim 6, wherein the sounding packet is a null data packet (NDP) sounding packet.

8. The apparatus of claim 6, wherein:
    the steering matrix feedback information for the subchannel block includes information corresponding to a compressed steering matrix that corresponds to the subchannel block; and
    the communication frame includes the information corresponding to the compressed steering matrix.

9. The apparatus of claim 6, wherein:
    the steering matrix feedback information for the subchannel block includes information corresponding to an uncompressed steering matrix that corresponds to the subchannel block; and the communication frame includes the information corresponding to the uncompressed steering matrix.

10. The apparatus of claim 6, wherein one of:
a packet bandwidth of the sounding packet is 40 megahertz (MHz) and the subchannel block spans 20 MHz;
the packet bandwidth of the sounding packet is 80 MHz and the subchannel block spans 40 MHz;
the packet bandwidth of the sounding packet is 160 MHz and the subchannel block spans 80 MHz; or
the packet bandwidth of the sounding packet is 160 MHz and the subchannel block spans 40 MHz.

11. A method, comprising:
transmitting, by a first communication device, a sounding packet to a second communication device over a communication channel such that the sounding packet spans an entire bandwidth of the communication channel;
receiving, at the first communication device, a communication frame from the second communication device, the communication frame responsive to the sounding packet, the communication frame including steering matrix feedback information for a subchannel block of the communication channel, wherein:
the subchannel block spans a contiguous partial bandwidth of the communication channel and does not span the entire bandwidth of the communication channel, and
the communication frame does not include steering matrix feedback information for one or more other subchannel blocks of the communication channel that respectively span one or more other respective contiguous partial bandwidths of the communication channel;
using, at the first communication device, the steering matrix feedback information for the subchannel block to identify a steering matrix for use in transmitting to the second communication device; and
applying, at the first communication device, the identified steering matrix to only a portion, in frequency, of an information carrying packet, wherein the portion, in frequency, of the information carrying packet corresponds, in frequency, to the subchannel block, and does not correspond, in frequency to the one or more other subchannel blocks of the communication channel.

12. The method of claim 11, wherein the sounding packet is a null data packet (NDP) sounding packet.

13. The method of claim 11, wherein:
the steering matrix feedback information for the subchannel block includes information corresponding to a compressed steering matrix that corresponds to the subchannel block; and
using the steering matrix feedback information for the subchannel block to identify the steering matrix comprises using the information corresponding to the compressed steering matrix to identify the steering matrix for use in transmitting to the second communication device.

14. The method of claim 11, wherein:
the steering matrix feedback information for the subchannel block includes information corresponding to an uncompressed steering matrix that corresponds to the subchannel block; and
using the steering matrix feedback information for the subchannel block to identify the steering matrix comprises adopting the uncompressed steering matrix as the steering matrix for use in transmitting to the second communication device.

15. The method of claim 11, wherein one of:
a packet bandwidth of the sounding packet is 40 megahertz (MHz) and the subchannel block spans 20 MHz;
the packet bandwidth of the sounding packet is 80 MHz and the subchannel block spans 40 MHz;
the packet bandwidth of the sounding packet is 160 MHz and the subchannel block spans 80 MHz; or
the packet bandwidth of the sounding packet is 160 MHz and the subchannel block spans 40 MHz.

16. An apparatus, comprising:
a network interface device associated with a first communication device, wherein the network interface device is implemented on one or more integrated circuit (IC) devices, and wherein the network interface device configured to:
transmit, via a plurality of antennas, a sounding packet to a second communication device over a communication channel such that the sounding packet spans an entire bandwidth of the communication channel, and
receive a communication frame from the second communication device, the communication frame responsive to the sounding packet, the communication frame including steering matrix feedback information for a subchannel block of the communication channel, wherein:
the subchannel block spans a contiguous partial bandwidth of the communication channel and does not span the entire bandwidth of the communication channel, and
the communication frame does not include steering matrix feedback information for one or more other subchannel blocks of the communication channel that respectively span one or more other respective contiguous partial bandwidths of the communication channel;
wherein the network interface device includes a steering vector controller implemented on the one or more ICs, the steering vector controller configured to use the steering matrix feedback information to identify a steering matrix for use in transmitting to the second communication device; and
wherein the network interface device further includes a spatial steering controller implemented on the one or more ICs, the spatial steering controller configured to apply the identified steering matrix to only a portion, in frequency, of an information carrying packet to be transmitted by the first communication device, wherein the portion, in frequency, of the information carrying packet corresponds, in frequency, to the subchannel block, and does not correspond, in frequency to the one or more other subchannel blocks of the communication channel.

17. The apparatus of claim 16, wherein the sounding packet is a null data packet (NDP) sounding packet.

18. The apparatus of claim 16, wherein:
the steering matrix feedback information for the subchannel block includes information corresponding to a compressed steering matrix that corresponds to the subchannel block; and
the steering vector controller configured to use the information corresponding to the compressed steering matrix to identify the steering matrix for use in transmitting to the second communication device.

19. The apparatus of claim 16, wherein:
the steering matrix feedback information for the subchannel block includes information corresponding to an uncompressed steering matrix that corresponds to the subchannel block; and
the steering vector controller configured to adopt the uncompressed steering matrix as the steering matrix for use in transmitting to the second communication device.

20. The apparatus of claim 16, wherein one of:
a packet bandwidth of the sounding packet is 40 megahertz (MHz) and the subchannel block spans 20 MHz;
the packet bandwidth of the sounding packet is 80 MHz and the subchannel block spans 40 MHz;
the packet bandwidth of the sounding packet is 160 MHz and the subchannel block spans 80 MHz; or
the packet bandwidth of the sounding packet is 160 MHz and the subchannel block spans 40 MHz.

* * * * *